Patented Nov. 8, 1938

2,135,735

UNITED STATES PATENT OFFICE 2,135,735

INK COMPOSITIONS

Emil Schwabe, Buenos Aires, Argentina, assignor to American Hyalsol Corporation, Wilmington, Del., a corporation of Delaware No Drawing. Application October 26, 1932, Serial No. 639,739. In Germany November 3, 1931

11 Claims. (Cl. 134—28)

This invention relates to ink or dye-stuff compositions for use in the production of carbon papers, typewriter ribbons, multiplying stencils and other duplicate printing and writing means.

Ink compositions for the above purposes heretofore employed have in general been composed of oils, fats, free fatty acids or waxes, together with either fat-soluble aniline dyes or pigment colors (lakes and lamp black). Carbon papers produced with such compositions containing soluble dyes have the disadvantage that they tend to smear, particularly when first applied, and they are not durable during storage due to a drying of the base constituents. Carbon papers produced with such pigment compositions wear out very quickly during use, due to the fact that one half or more of the composition consists of undyed material.

Carbon papers having ink compositions containing both dye and pigment as heretofore compounded are somewhat better than those containing only one type of coloring matter, but the disadvantages of each are only mitigated and not eliminated.

In accordance with the present invention, new carriers or bases for dyes and pigments for use in the production of carbon papers and the like have been discovered, consisting of the higher molecular alcohols particularly of the aliphatic series. Carbon papers produced with compositions having these materials as carriers have a number of technical advantages not possessed by those produced with fatty bases heretofore employed, as later will be described.

Alcohols found suitable for the preparation of the present ink compositions include cetyl alcohol, octadecyl alcohol, oleyl alcohol, ricinoleyl alcohol, linoleyl alcohol, and the alcohols obtained from cocoanut oil which have from 8 to 18 carbon atoms in the molecule. It is not necessary to use pure alcohols, for mixtures obtained during manufacture from natural oils, fats, etc., may also be used to good advantage with practically the same satisfactory results.

In addition to the simple alcohols of one or more OH groups, there may also be used higher molecular aliphatic alcohol compounds, or alcohols containing functional groups as keto or aldehyd groups or substituents such as halogens, aromatic residues, etc.

Carbon papers coated with the present compositions can be of greater thickness than heretofore employed due to the higher proportion of color value obtainable in the coating composition. Hence more durable carbon paper can now be made available to the market.

The ink compositions compounded in accordance with the instant invention have also the advantage that alcohol soluble dyes may be used in their manufacture. Heretofore only those dyes which are soluble in fat or waxes could be employed. Alcohol soluble dyes have been found to readily dissolve in the higher molecular aliphatic alcohols, with the aid of a little heat to melt the alcohol if the same is a solid. These alcohols have also an excellent dispersive power for pigment colors.

Carbon papers produced with the present compositions are substantially non-smearing in use. They are free of rancidity producing substances and do not dry-out appreciably over long periods of time and hence, have excellent storage qualities.

Illustrative examples of my new composition are as follows:

Example 1.—6 kilograms of cetyl alcohol and 2 kilograms of carnauba wax are melted together and 2 kilograms of crystal violet added thereto. The mass is stirred and slightly heated until the dye is completely dissolved. Thereupon two kilograms of sesame oil are added and stirred into the mass. The resulting homogeneous mixture is then filtered in any suitable manner as through a cloth. In preparing carbon paper, the product is applied to the paper in the usual manner.

Example 2.—2 kilograms of sesame oil are added during stirring to 4 kilograms of the melted mass as produced in Example 1, and 4 kilograms of violet lake are stirred into the mixture. The resulting mass is ground on a heated roller mill and finally applied to the paper in the usual manner.

In the manufacture of stencil inks, typewriter ribbons etc., similar compositions may be used, the essential point of my invention being the use of higher molecular alcohols as dispersion and solution agents for the dye composition.

I claim:

1. An ink composition containing cetyl alcohol as a carrier for coloring matter therein.

2. A duplicating writing and printing ink composed of a wax base, a plasticizer for said wax comprising a higher molecular aliphatic alcohol having from 12 to 18 carbon atoms, and a dyestuff dissolved in said alcohol.

3. In a duplicating printing and writing ink composition of a form ranging from waxy to oily consistency, a higher molecular aliphatic alcohol having at least 12 carbon atoms, said alcohol being present in an amount which serves both as a plasticizing agent and as a dispersing agent for the coloring matter in said composition.

4. In a waxy ink composition for carbon papers, typewriter ribbons and other duplicating media, a higher molecular aliphatic alcohol having at least 12 carbon atoms in a sufficient amount to permit a high proportion of color value and to impart a plasticizing effect to the composition, said composition containing a dye soluble in said alcohol compound.

5. An ink composition for duplicate printing and writing containing as a carrier for coloring matter therein a higher molecular aliphatic alcohol compound having from about 12 to 18 carbon atoms, said alcohol compound constituting the major portion of the solid base of said composition.

6. An ink paste composition comprising a primary higher molecular aliphatic alcohol compound having at least 12 carbon atoms in the molecule and a dye soluble in said alcohol compound, said alcohol compound constituting the major portion of the solid base of said composition.

7. An ink composition for use in duplicate printing and writing containing as the principal carrier for the coloring matter therein a primary higher molecular aliphatic alcohol having at least 12 carbon atoms in the molecule and an alcohol-soluble dye, said alcohol constituting the major portion of the solid base of said composition.

8. An ink composition for duplicate printing and writing comprising a straight chain higher molecular aliphatic alcohol having at least 12 carbon atoms, a dye soluble in said alcohol and a pigment, said alcohol serving as the principal carrier for the coloring matter therein, and constituting the major portion of the solid base of said composition.

9. An ink composition for duplicate printing and writing containing as the principal carrier for the coloring matter a straight chain higher molecular aliphatic alcohol having at least 12 carbon atoms in the molecule, said alcohol constituting the major portion of the solid base of said composition.

10. An ink composition for duplicate printing and writing containing as the principal carrier for the coloring matter an aliphatic alcohol compound having at least 12 carbon atoms in the chain of the hydroxy alkyl radical, said alcohol compound constituting the major portion of the solid base of said composition.

11. An ink composition for duplicate printing and writing containing as a carrier for coloring matter therein higher molecular alcohols from cocoanut oils, said alcohols being present in an amount which serve both as a plasticizing agent and as a dispersing agent for the coloring matter in said composition.

EMIL SCHWABE.